Patented Mar. 5, 1929.

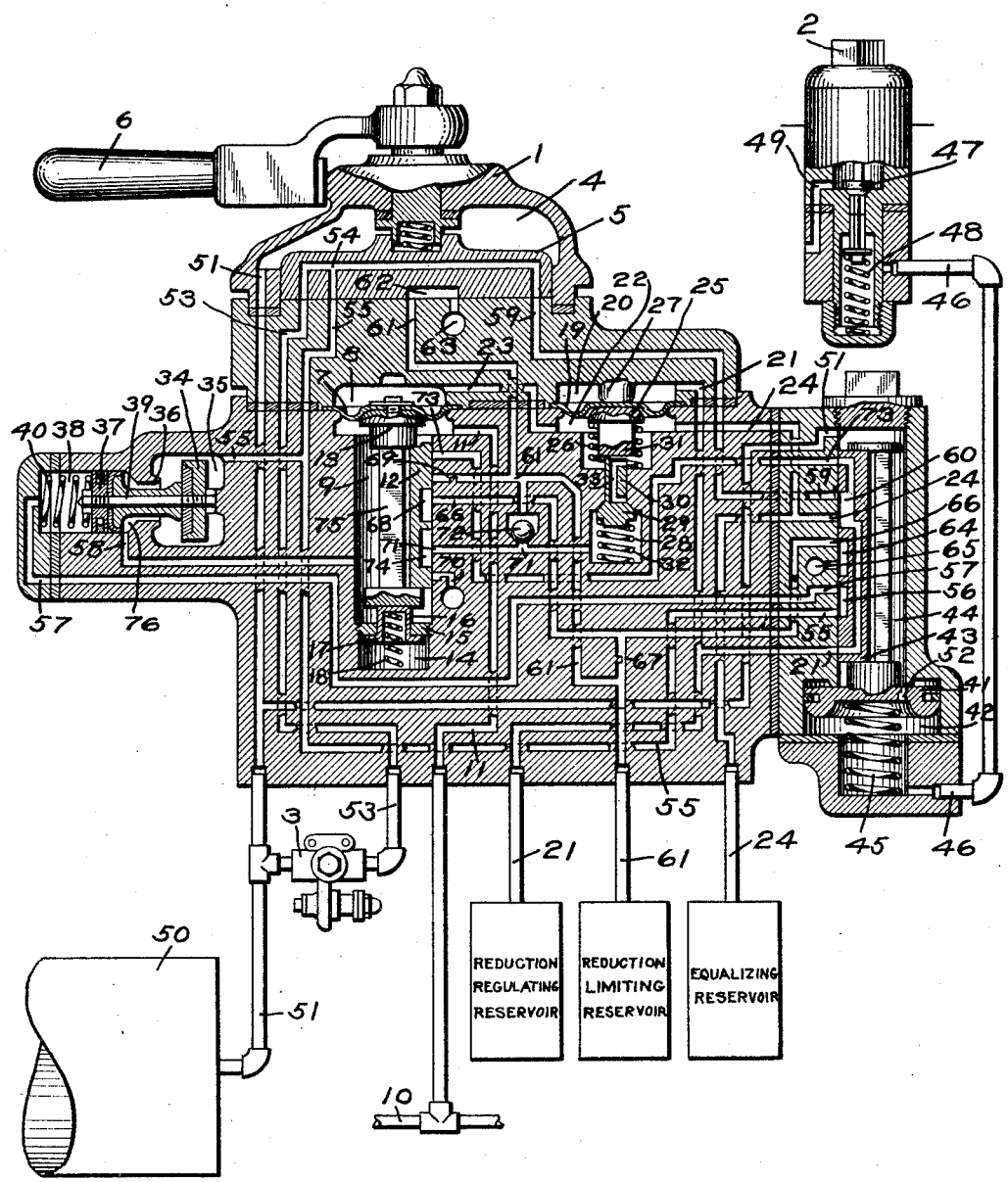

1,703,908

UNITED STATES PATENT OFFICE.

THOMAS H. THOMAS, OF EDGEWOOD, AND CLAUDE A. NELSON, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed January 7, 1928. Serial No. 245,067.

This invention relates to fluid pressure brakes and more particularly to a locomotive brake equipment of the type having means for automatically effecting a reduction in brake pipe pressure.

In order to obtain smooth and safe braking of a train, the reduction in brake pipe pressure must be made at such a gradual rate as to prevent the slack in the train from running in harshly, which in some cases might cause a wreck.

One object of our invention is to provide improved means for automatically effecting a reduction in brake pipe pressure at such a rate as to prevent harsh gathering of the slack.

Leakage of fluid under pressure from the brake pipe to the atmosphere may be such that when added to the reduction in brake pipe pressure as effected by the operation of the usual brake pipe discharge valve, it will cause an excessive rate of reduction in brake pipe pressure, which is undesirable, in that a too rapid rate of drop in brake pipe may cause a harsh and disastrous gathering of the train slack.

Another object of our invention is to provide improved means for preventing brake pipe leakage from increasing the rate of brake pipe reduction to a degree exceeding that permissible for safely gathering the train slack.

The severity of slack action in a train decreases as the train length is decreased, so that for a short train, the rate of effecting a brake pipe reduction may be faster than for a longer train without causing a harmful running in of the slack.

Another object of our invention is to provide improved means for automatically varying the rate of effecting a brake pipe reduction in accordance with the train length.

Other objects and advantages will appear in the following more detailed description of our invention.

In the accompanying drawing, the single figure is a diagrammatic view of a train control apparatus embodying our invention.

For the sake of simplicity, only so much of an automatic train control equipment is shown in the drawing as is deemed necessary to a clear understanding of the invention, the parts of the equipment shown, including a brake valve device 1, a magnet valve device 2 and a feed valve device 3.

The brake valve device comprises a casing having a chamber 4, containing a rotary valve 5 adapted to be operated by a handle 6 and an equalizing valve mechanism comprising a diaphragm 7 having at one side a chamber 8 connected to an equalizing reservoir, by means to be hereinafter described, and having at the opposite side a chamber 9 connected to the brake pipe 10 through a passage 11. Contained in the valve chamber 9 is a slide valve 12 disposed between two shoulders on a stem 75 of a diaphragm head 13, which diaphragm head is secured to the diaphragm 7 and is adapted to be operated by the deflection of said diaphragm. A chamber 14 is formed adjacent the valve chamber 9 and is separated therefrom by an apertured washer 15 having screw-threaded engagement in the wall of chamber 9. A stop 16 for engaging the stem 75 is adapted to operate through the aperture in washer 15 and is provided at the lower edge with a radial flange 17, adapted to engage the washer 15 and to limit upward travel of the stop. Interposed between the stop 16 and the end wall of the chamber 14 is a spring 18, urging the stop 16 upwardly.

The brake valve casing also contains a diaphragm 19, having at one side a chamber 20 connected to a reduction regulating reservoir through passage and pipe 21 and having at the opposite side, a chamber 22 connected to the equalizing diaphragm chamber 8 through a passage 23 and also connected to the equalizing reservoir through passage and pipe 24. A valve 29, contained in a valve chamber 28, is provided with a stem 30, which extends upwardly through a bore in a dividing wall between the chambers 28 and 22, the upper end of the valve stem 30 being adapted to engage the depending stem 31 of a diaphragm head 25, such head being maintained in engagement with the diaphragm 19, by the pressure of a spring 26. Upward deflection of said diaphragm is limited by a stop lug 27 contained in the chamber 20. Downward deflection of said diaphragm is adapted to unseat the valve 29, against the yielding resistance of a spring 32, contained in the valve chamber 28. A port 33 in the valve stem 30 is adapted to connect chambers 22 and 28, when the valve 29 is unseated, but with said valve seated, comunication between said chambers through the port 33 is cut off.

Associated with the brake valve device is a cut-off valve 34, contained in a chamber 35 and adapted, in one position, to seal on a seat ring 36. A cut-off valve piston 37, contained in a chamber 38, is connected to the cut-off valve 34 by a stem 39 and is adapted to operate the cut-off valve. A spring 40, also contained in the chamber 38, acts on the cut-off valve piston and tends to hold the cut-off valve 34 away from the seat ring 36.

Preferably associated with the brake valve device is an application valve portion comprising an application piston 41 contained in a chamber 42 and a slide valve 43 contained in a chamber 44 and adapted to be operated by said piston, which piston is opposed in outward movement by the pressure of a spring 45 which is disposed in the chamber 42. The chamber 42 is connected to the magnet valve device 2 through passage and pipe 46.

The magnet valve device 2 comprises a magnet and a valve 47 adapted to be operated by said magnet, a spring 48 urging the valve 47 away from its seat. The magnet is controlled by train control apparatus (not shown) in such a manner, that when the track conditions are unfavorable, the magnet is deenergized and valve 47 is unseated by spring 48, so that passage 46 from the application piston chamber 42 is connected to the atmosphere through the atmospheric passage 49. When the track conditions are favorable, the magnet is energized and seats the valve 47, thereby cutting off communication from the piston chamber 42 to the atmosphere.

In operation, fluid under pressure is supplied from the main reservoir 50 to the rotary valve chamber 4 of the brake valve device and also to the application valve chamber 44 and to the feed valve device 3 through pipe and passage 51, and from the application valve chamber, fluid at main reservoir pressure flows through a restricted port 52 in the application piston 41 to the application piston chamber 42 and from thence through passage and pipe 46 to the magnet valve device 2. With the train operating in territory governed by favorable track conditions, the magnet of the magnet valve device 2 is energized and the valve 4 thereby held seated, which permits the equalization of fluid pressures on the opposite sides of the application piston 41, so that the spring 45 then forces the application piston 41 and slide valve 43 to the inward or release position, as shown in the drawing.

Fluid at the usual pressure employed in the brake pipe is supplied by the feed valve device 3 to the seat of the rotary valve 5 through pipe and passage 53, and with the brake valve handle 6 in running position, as shown in the drawing, fluid at feed valve pressure flows from the passage 53 to the cut-off valve piston chamber 38, by way of cavity 54 in the rotary valve 5, passage 55, cavity 56 in the application slide valve 43 and passage 57. At the same time, fluid at feed valve pressure flows from passage 55 into the cut-off valve chamber 35. When the brake system is uncharged, the spring 40 holds the cut-off valve 34 unseated, so that in charging, since the fluid pressure builds up on the opposite sides of the cut-off valve piston 37 at the same rate, the spring 40 continues to maintain the cut-off valve unseated, so that fluid at feed valve pressure is permitted to flow from the chamber 35 to brake pipe 10 by way of chamber 76, passage 58, equalizing valve chamber 9 and passage and pipe 11.

Fluid at feed valve pressure also flows from cavity 54 in the rotary valve 5 to the equalizing reservoir and the reduction regulating valve diaphragm chamber 22 through passage 59, cavity 60 in the application slide valve 43 and passage and pipe 24 and from diaphragm chamber 22 to the equalizing diaphragm chamber 8 through passage 23. The fluid pressures acting on the opposite sides of the equalizing diaphragm 7, thus building up at substantially the same rate, the moving parts of the equalizing valve mechanism are maintained, by gravity, in the position shown in the drawing, in which position the diaphragm head stem 75 engages the stop 16, the slide valve 12 thereby assuming the normal position. The reduction regulating valve diaphragm chamber 20 and reduction regulating reservoir are also charged with fluid at feed valve pressure by flow through the cavity 60 in the application slide valve 43 and passage and pipe 21. The fluid pressures thus being equalized on the opposite sides of the reduction regulating diaphragm 19, the spring 26, acting on the diaphragm head 25, holds the diaphragm against the stop 27, and thereby permits spring 32 to hold valve 29 seated.

With the brake valve handle in running position, as shown in the drawing, the reduction limiting reservoir is vented to the atmosphere through pipe and passage 61, cavity 62 in the rotary valve 5 and the atmospheric exhaust port 63.

If the track conditions become unfavorable, the magnet of the magnet valve device 2 is deenergized and the spring 48 then unseats the valve 47, which permits the fluid under pressure to be vented from the application piston chamber 42 to the atmosphere through pipe and passage 46 and the atmospheric passage 49. The pressure of main reservoir fluid in the application valve chamber 44 then shifts the application piston 41 and slide valve 43 downwardly to application position, against the resisting pressure of the spring 45.

In application position of the application slide valve, the cut-off valve piston chamber 38 is vented to the atmosphere through passage 57, cavity 64 in the application slide valve 43 and the atmospheric exhaust passage 65. The brake pipe pressure on the opposite side of the cut-off valve piston 37 then shifts said piston outwardly, thereby compressing the spring 40 and causing the cut-off valve 34 to seat on the seat ring 36, so as to prevent further flow of fluid at feed valve pressure from chamber 35 to the brake pipe 10.

With the application slide valve in application position, passage 59, which is normally connected to the feed valve device 3 through cavity 54 in the rotary valve 5, is lapped and the equalizing reservoir, equalizing diaphragm chamber 8 and reduction regulating valve diaphragm chamber 22 are connected to the reduction limiting reservoir through pipe and passage 24, cavity 60 in the application slide valve 43, passage 66 and the choked passage 67, thereby permitting the equalizing reservoir pressure to reduce at a slow rate, as governed by the flow capacity of the choked passage 67.

If the equalizing reservoir pressure, becomes lower than the brake pipe pressure in valve chamber 9, as occurs in a substantially airtight brake pipe of a long train, the diaphragm 7 is deflected upwardly by the higher brake pipe pressure in valve chamber 9, thereby causing the stem 75 to move the slide valve 12 upwardly to a position in which cavity 68 in the slide valve connects passage 66, which is open to the equalizing reservoir, to the choked passage 69 leading to the reduction limiting reservoir by way of passage and pipe 61. The fluid at equalizing reservoir pressure is thus permitted to flow from passage 66 to the reduction limiting reservoir at an increased rate as governed by the flow capacity of the choked passage 69 in addition to the flow through the choked passage 67. The slide valve uncovers the restricted brake pipe discharge passage 70 at substantially the same time as the choked passage 69 is uncovered and thereby permits the venting of fluid under pressure from the valve chamber 9 and the brake pipe to the atmosphere.

If, as may occur in case of brake pipe leakage, the pressure in valve chamber 9 reduces at a rate exceeding the rate of drop in pressure in the diaphragm chamber 8 and the equalizing reservoir, as governed by the flow capacity of the choked passage 67, then the pressure in valve chamber 9 becomes lower than the pressure of fluid in the equalizing reservoir, effective in diaphragm chamber 8, and the diaphragm 7 is therefore deflected downwardly, thereby shifting the slide valve 12 downwardly, against the pressure of spring 18, to a position in which the passage 73 is uncovered. Said passage is connected to the application valve chamber 44, when the application slide valve 43 is in application position, so that fluid at main reservoir pressure is thereby permitted to flow from the application valve chamber 44 to the valve chamber 9 and maintain the brake pipe pressure, effective therein, substantially equal to the reducing equalizing reservoir pressure in the chamber 8. According to the rate of pressure drop in valve chamber 9, the slide valve 12 is operated to vary the opening of the passage 73, so as to permit just sufficient flow of main reservoir fluid into the chamber 9 to neutralize the effect of the leakage therein.

If the brake pipe pressure in valve chamber 9 reduces at a rate slightly slower than the equalizing reservoir pressure reduces through the choked passage 67, as may occur in case of some small degree of leakage from chamber 9 or with some short length of train, then the equalizing reservoir pressure in diaphragm chamber 8 becomes less than the pressure in valve chamber 9 and the equalizing valve mechanism starts to move upwardly. The degree of such upward movement may not be such as to completely uncover the choked passages 69 and 70, as in the case of an airtight brake pipe, but instead, the passages 69 and 70 are only partly uncovered, so as to permit the brake pipe pressure in valve chamber 9 to reduce by flow through the partly open passage 70 at the same rate as the equalizing reservoir pressures in diaphragm chamber 8 reduces through the choked passage 67 and the partly opened choked passage 69. The amount of opening of the choked passages 69 and 70 varies under different train conditions such as train length or brake pipe leakage, in order to maintain the pressures in chambers 8 and 9 substantially equal.

It will be noted, that in case the equalizing reservoir pressure in diaphragm chamber 8 does not reduce faster than the brake pipe pressure in valve chamber 9 reduces through the choked passage 70, that the equalizing valve mechanism so operates as to prevent the pressure in valve chamber 9 from reducing at a rate exceeding the rate of reduction in equalizing reservoir pressure effective in diaphragm chamber 8.

When the equalizing reservoir pressure is reduced to a predetermined degree, the bottled up pressure in the reduction regulating reservoir, which is effective in diaphragm chamber 20, deflects the diaphragm 19 downwardly against the reduced equalizing reservoir pressure in chamber 22 and also against the pressure of the spring 26, thereby causing the stem 31 of the diaphragm head 25 to engage the valve stem 30 and unseat the valve 29. Fluid under pressure then flows from the diaphragm chamber 22 and the equalizing reservoir to the reduction limiting reservoir through the port 33 in the valve stem 30, the valve chamber 28, passage 71, past the ball check valve 72 and passage and pipe 61. The rate of reduction in equalizing reservoir pressure is thereby increased an amount equal to the flow capacity of the port 33. In case the initial reduction in brake pipe pressure in valve chamber 9 is governed by the rate of drop in the equalizing reservoir pressure in the diaphragm chamber 8, in the manner hereinbefore described, then increasing the rate of reduction in equalizing reservoir pressure by the flow capacity of the port 33 in valve stem 30, permits the brake pipe pressure in valve chamber 9 to operate the equalizing valve mechanism and cause the slide valve 12 to fully uncover the restricted brake pipe discharge passage 70 so as to permit an increase in the rate of reduction in the brake pipe pressure in valve chamber 9.

In order to limit the reduction in equalizing reservoir pressure to a predetermined amount and thereby prevent a total venting of the fluid under pressure from the valve chamber 9, the brake valve handle 6 is operated, upon the initiation of the reduction in equalizing reservoir pressure, to turn the rotary valve 5 and lap the passage 61, from the reduction limiting reservoir. The total reduction in pressure of the equalizing reservoir fluid is thereby limited to equalization into the reduction limiting reservoir, so that when the pressure in valve chamber 9 becomes reduced to the same degree, the equalized pressures on the equalizing diaphragm 7 permits the equalizing valve mechanism to assume its normal position, in which the brake pipe discharge passage 70 is covered by the slide valve 12.

After a full reduction in equalizing reservoir pressure takes place and the brake pipe discharge port 70 is lapped by the slide valve 12, if the pressure in valve chamber 9 tends to reduce, due to leakage, the equalizing reservoir pressure in chamber 8 deflects the diaphragm 7 downwardly and causes the stem 75 to shift the slide valve 12 downwardly to a position in which cavity 74 connects passages 71 and 70. Since passage 71 is open to the equalizing reservoir, when the valve 29 is unseated, fluid is vented from the equalizing reservoir to the atmosphere through the brake pipe discharge passage 70. The pressure of fluid in equalizing reservoir and in the diaphragm chamber 8 being reduced, further downward movement of the equalizing mechanism is prevented, so that the slide valve 12 is not moved sufficiently to uncover the passage 73. Thus, since passage 73 remains lapped under such a condition, fluid at main reservoir pressure is prevented from flowing into the chamber 9 to maintain the pressure therein.

A ball check valve 72 is interposed between passages 61 and 71, so that when effecting the initial portion of the reduction in equalizing reservoir pressure at a time when the valve 29 is seated, if the slide valve 12 is moved down to permit the flow of main reservoir fluid from passage 73 to valve chamber 9, the reduction limiting reservoir will not be vented to the atmosphere through pipe and passage 61, passage 71, cavity 74 in the equalizing slide valve 12 and the brake pipe discharge passage 70.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. In a fluid pressure brake, the combination with a brake pipe, an equalizing reservoir, valve means for venting fluid from the brake pipe, and a movable abutment subject to the opposing pressures of the brake pipe and equalizing reservoir for operating said valve means, of means for venting fluid from the equalizing reservoir through a communication controlled by said valve means.

2. In a fluid pressure brake, the combination with a brake pipe, an equalizing reservoir, and an equalizing valve device subject to the opposing pressures of the brake pipe and the equalizing reservoir and operated upon a reduction in pressure in the equalizing reservoir for venting fluid from the brake pipe, of means for venting fluid from the equalizing reservoir to initate the operation of said equalizing valve device, an additional communication for venting fluid from the equalizing reservoir being open upon movement of said equalizing valve device to vent fluid from the brake pipe 3. In a fluid pressure brake, the combination with a brake pipe, an equalizing reservoir, and an equalizing valve device subject to the opposing pressures of the brake pipe and the equalizing reservoir and operated upon a reduction in pressure in the equalizing reservoir for venting fluid from the brake pipe, of means for venting fluid from the equalizing reservoir through a restricted port to initiate the operation of said equalizing valve device, fluid being vented from the equalizing reservoir through another restricted port in the position of said equalizing valve device in which fluid is vented from the brake pipe.

4. In a fluid pressure brake, the combination with a brake pipe, an equalizing reservoir, and an equalizing valve device subject to the opposing pressures of the brake pipe and the equalizing reservoir and operated upon a reduction in pressure in the equalizing reservoir for venting fluid from the brake pipe, of means for venting fluid from the equalizing reservoir at a restricted rate to initiate the operation of said equalizing valve device, means controlled by said equalizing valve device for venting fluid from the equalizing reservoir through another restricted port, and means operated upon a predetermined reduction in pressure in the equalizing reservoir for also venting fluid from the equalizing reservoir.

5. In a fluid pressure brake, the combination with a brake pipe and an equalizing reservoir, of an equalizing valve device subject to the opposing pressures of the equalizing reservoir and the brake pipe, and operated upon a reduction in equalizing reservoir pressure for venting fluid from the brake pipe, said valve device being operated upon a reduction in brake pipe pressure below the equalizing reservoir pressure for venting fluid from the equalizing reservoir.

6. In a fluid pressure brake, the combination with a brake pipe and an equalizing reservoir, of an equalizing valve device subject to the opposing pressures of the equalizing reservoir and the brake pipe, and operated upon a reduction in equalizing reservoir pressure for venting fluid from the brake pipe, said valve device being operated upon a reduction in brake pipe pressure below the equalizing reservoir pressure for venting fluid from the equalizing reservoir to the atmosphere.

7. In a fluid pressure brake, the combination with a brake pipe and an equalizing reservoir, of an equalizing valve device subject to the opposing pressures of the equalizing reservoir and the brake pipe, and operated upon a reduction in equalizing reservoir pressure for venting fluid from the brake pipe, said valve device being operated upon movement under a reduction in brake pipe pressure below equalizing reservoir pressure to first vent fluid from the equalizing reservoir and then to supply fluid under pressure to the brake pipe.

8. In a fluid pressure brake, the combination with a brake pipe and equalizing reservoir, of an equalizing valve device comprising a movable abutment subject to the opposing pressures of the brake pipe and equalizing reservoir and a slide valve operated by said abutment and having one position for venting fluid from the brake pipe, another position in which fluid under pressure is supplied to the brake pipe, and another position in which fluid is vented from the equalizing reservoir.

9. In a fluid pressure brake, the combination with a brake pipe and equalizing reservoir, of an equalizing valve device comprising a movable abutment subject to the opposing pressures of the brake pipe and equalizing reservoir and a slide valve operated by said abutment and having positions for venting fluid from the brake pipe, from the equalizing reservoir, and for supplying fluid under pressure to the brake pipe.

10. In a fluid pressure brake, the combination with a brake pipe and equalizing reservoir, of a reduction reservoir and an equalizing valve device comprising a movable abutment subject to the opposing pressures of the brake pipe and the equalizing reservoir and a valve operated by said abutment and having positions for venting fluid from the brake pipe, for supplying fluid under pressure to the brake pipe, for venting fluid from the equalizing reservoir to the reduction reservoir, and for venting fluid from the equalizing reservoir to the atmosphere.

11. In a fluid pressure brake, the combination with a brake pipe and an equalizing reservoir, of a valve device subject to the opposing pressures of the equalizing reservoir and the brake pipe and operated upon a reduction in pressure in the equalizing reservoir for venting fluid under pressure from the brake pipe and upon a reduction in brake pipe pressure below the equalizing reservoir pressure for venting fluid from the equalizing reservoir and means operated upon a predetermined reduction in equalizing reservoir pressure for opening communication from the equalizing reservoir through which fluid is vented by operation of said valve device.

12. In a fluid pressure brake, the combination with a brake pipe and an equalizing reservoir, of a valve device subject to the opposing pressures of the equalizing reservoir and the brake pipe and operated upon a reduction in pressure in the equalizing reservoir for venting fluid under pressure from the brake pipe and upon a reduction in brake pipe pressure below the equalizing reservoir pressure for opening communication through which fluid under pressure is supplied to the brake pipe, and means operated upon a reduction in equalizing reservoir pressure to a predetermined degree for preventing movement of said valve device to open said communication.

13. In a fluid pressure brake, the combination with a brake pipe and an equalizing reservoir, of a valve device subject to the opposing pressures of the equalizing reservoir and the brake pipe and operated upon a reduction in pressure in the equalizing reservoir for venting fluid under pressure from the brake pipe and upon a reduction in brake pipe pressure below the equalizing reservoir pressure for opening communication through which fluid under pressure is supplied to the brake pipe, and means operated upon a reduction in equalizing reservoir pressure to a predetermined degree for venting fluid under pressure from the equalizing reservoir to prevent movement of said valve device to the position for opening said communication.

In testimony whereof we have hereunto set our hands this 3rd day of January, 1928.

THOMAS H. THOMAS.
CLAUDE A. NELSON.